Figure 1:
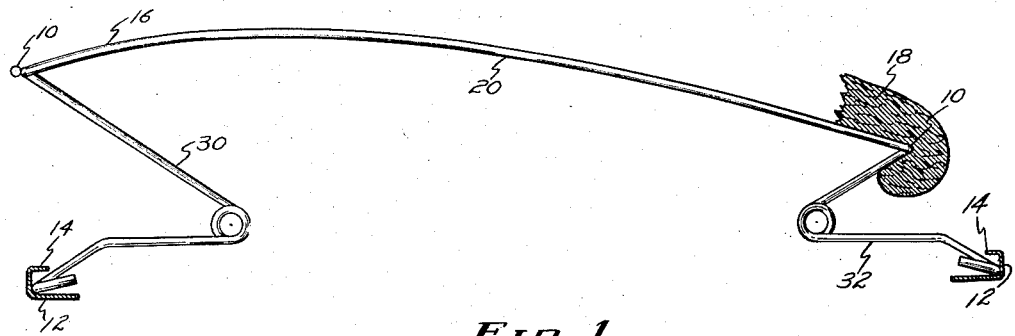

Feb. 3, 1959     M. STUBNITZ ET AL     2,871,923
SPRING STRUCTURE

Filed Jan. 14, 1957     3 Sheets-Sheet 1

INVENTOR
MAURICE STUBNITZ
LEWIS J. STERN

BY
ATTORNEY

Feb. 3, 1959 M. STUBNITZ ET AL 2,871,923
SPRING STRUCTURE
Filed Jan. 14, 1957 3 Sheets-Sheet 2
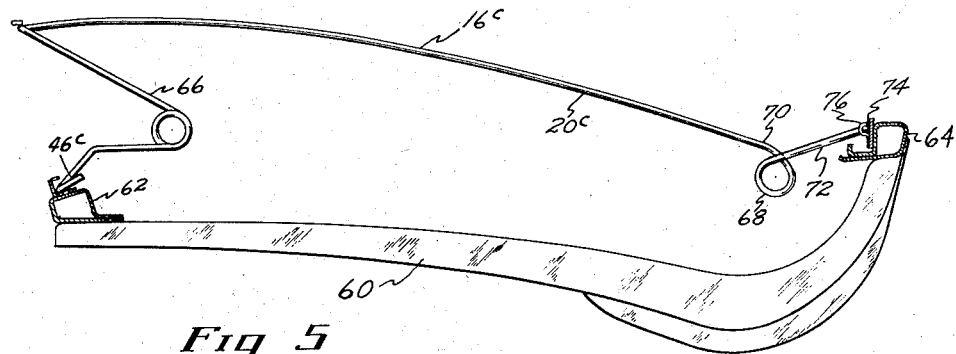
Fig 5
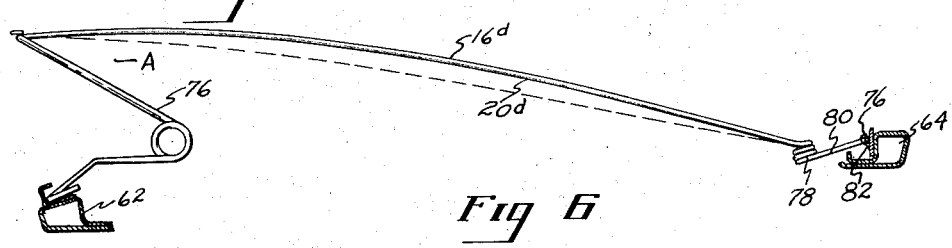
Fig 6
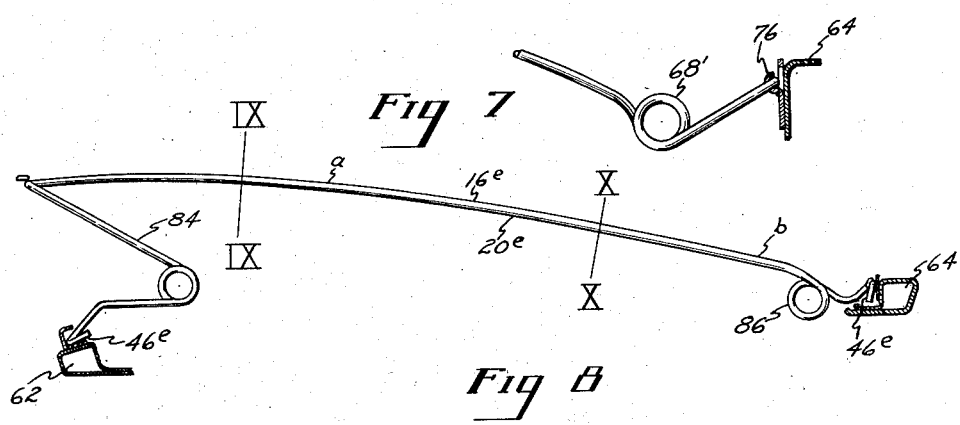
Fig 7
Fig 8
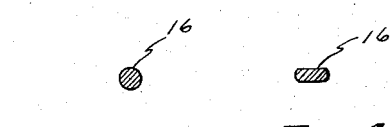
Fig 9  Fig 10
INVENTOR
MAURICE STUBNITZ
LEWIS J. STERN
BY
ATTORNEY Feb. 3, 1959
M. STUBNITZ ET AL
2,871,923
SPRING STRUCTURE
Filed Jan. 14, 1957
3 Sheets-Sheet 3
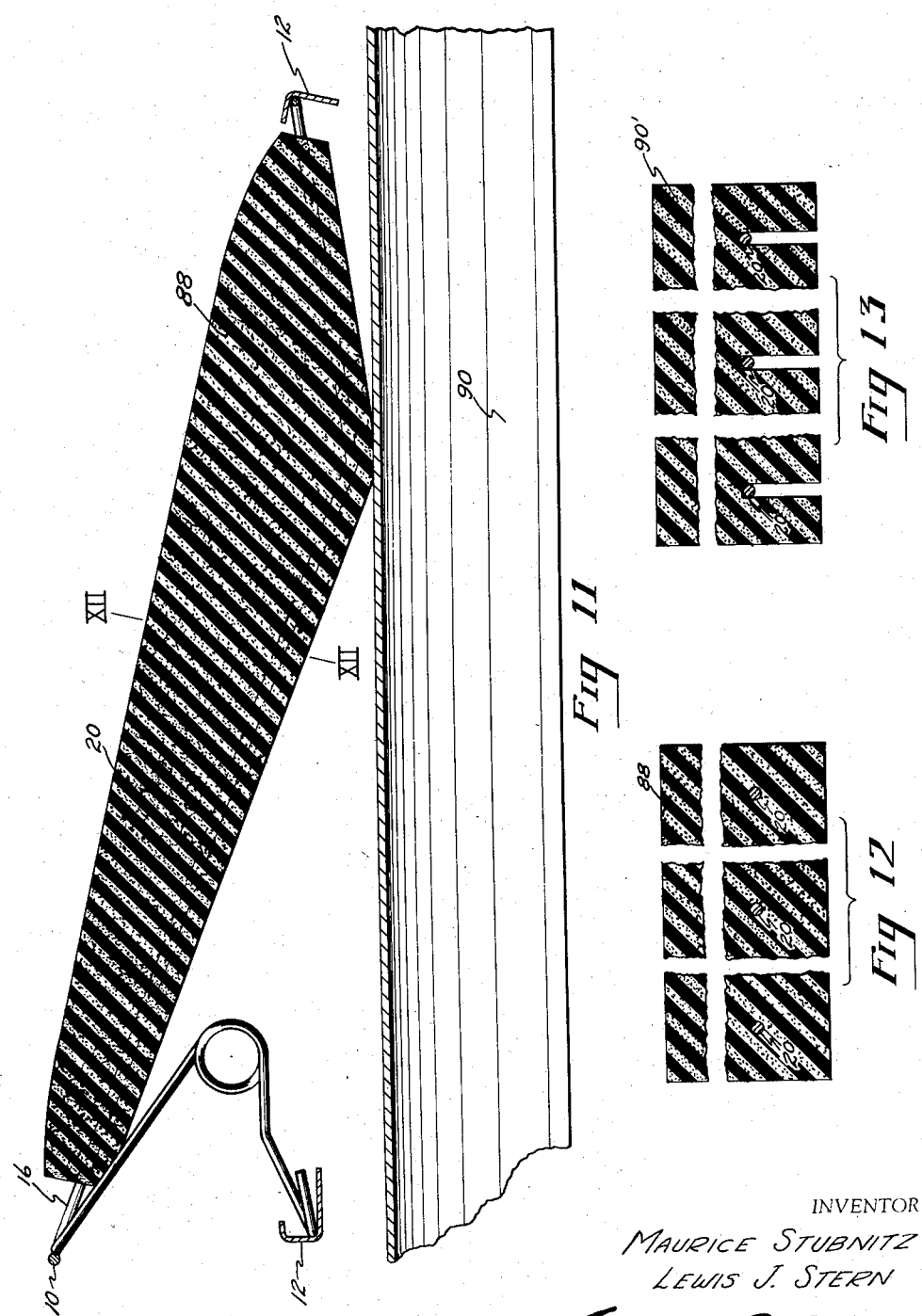
INVENTOR
MAURICE STUBNITZ
LEWIS J. STERN
BY
ATTORNEY

2,871,923
Patented Feb. 3, 1959

United States Patent Office

2,871,923
SPRING STRUCTURE

Maurice Stubnitz and Lewis J. Stern, Adrian, Mich., assignors to Stubnitz Greene Corporation, Adrian, Mich., a corporation of Michigan Application January 14, 1957, Serial No. 633,883

11 Claims. (Cl. 155—179)

The present invention relates to spring elements designed to constitute the main resilient supporting structure of seat constructions, being especially adapted for use in the manufacture of vehicle seats.

In the designing of a spring element for vehicle seats many factors must be considered which are not present in static seating as, for example, road shock, acceleration, deceleration centrifugal forces, etc. These factors are in addition to the necessity of keeping the seat thin to permit low profiling of the vehicle as well as being inexpensive to manufacture and, at the same time, providing a feeling of comfortable support to the vehicle passenger with a minimum of transmitted road shock and a maximum dampening of the resilient supporting action. A further problem concerns the necessity of providing a seat which is comfortable for persons of different weight. Lastly, the spring element of the vehicle seat must be durable and so designed as to give maximum trim life and of a structure capable of functioning without being detrimental to the trim.

Heretofore it has been considered necessary in order to provide a satisfactory vehicle seat to employ a great deal of spring wire in the construction thereof. This expedient was first employed in the fabrication of vehicle seats having so-called "Marshall" type of construction. To reduce cost, sinuous or so-called zig zag spring elements came into use and were used either alone or in combination with coil springs.

We have found that with a particular design of spring element that a satisfactory vehicle seat may be fabricated in which the amount of spring wire employed is greatly reduced over all previously acceptable designs. As originally in our co-pending application Serial No. 561,470, filed January 26, 1956, this has been accomplished by a spring wire element in the form of a stringer having major portions thereof defined by straight wire portions, the portions of the spring element which are not straight, or substantially so, being so formed and located as to impart to the spring construction the essential characteristics demanded by the manufacturers of vehicles.

According to the present invention, the form of spring element in the main area of support provided the occupant of the seat, is that of a straight spring wire portion extending parallel to the most prevalent direction of movement of the vehicle. For convenience of description, the main straight portion of wire of our improved spring element will be termed "linear spring" portion. This linear spring portion presents a uniform front to back support for the trimming material supported by the spring elements. As this linear spring portion is free from sinuous deformation along its length, the type of abrasive action experienced in zig zag spring elements between the trim and the U-bends as they "breathe" under an active load, is not experienced. In a seat construction fabricated from our new spring element, the form of the support under a load given by each individual linear spring portion is of a form complementing the form of that area of the body of the occupant resting upon and being supported by the seat. To provide the supporting surface of the seat collectively defined by the linear spring portions of the juxtaposed spring elements with the desired "feel" and riding qualities, we have made full use of the spring wire defining the fore and aft marginal supports for the linear spring portions. In general, the marginal supports take the form of "jack" springs defined by angular disposed straight wire reach portions extending from coil spring portions, one reach portion of each marginal support being an integral continuation of the linear spring portion with the other reach portion having a lateral portion defining fulcrum connections with the seat frame. One or both of the reach portions may have their integral continuation with the linear spring portion through a lateral torsion portion which, in most cases, will be attached to the upper border frame of the seat.

To compensate for the use of a minimum amount of wire in the linear spring portions, maximum use must be made of the spring wire in the marginal supports if the desired "feel" and riding qualities are to be economically obtained. This has been accomplished by having the fulcrumed reach of one or both of the marginal supports function in torsion as well as a resilient beam and to time such plural functions with the loading of the linear spring portions. As disclosed, integral angular portions extending from the fulcrum connection upon engagement with the seat frame impart "helper" spring characteristics to the marginal supports with the use of a minimum of spring wire.

In designing the marginal supports to give the desired supporting characteristics to the linear spring portions of our improved spring elements, we have also provided the front edge of the seat construction with a durable supporting surface for the front edge trim as well as adequate and comfortable support for the occupant's thighs. Furthermore, the design is such that, following deflection under the load of the occupant, the recoil of the supporting surface collectively defined by the linear spring portions is well dampened for the reason that the support on deflection is progressively provided by different portions of the marginal supports and the travel of the supporting surface in the direction of recoil under normal maximum deflection is relatively short.

Preferably, the cross-section of the wire form from which we fabricate our improved spring element is round where torsional stresses take place. However, in the areas where plain flexure or shear takes place we propose to flatten the wire in at least some of such areas as, for example, in the area defining the "linear spring" portion. By flattening the round wire stock in an area of substantial flexure of the spring element is used, the cost of the seat is reduced as the number of spring elements may be reduced as compared with the number required if the cross-section of the wire stock remains round through the entire length of the spring element and a gauge of wire is selected providing the required fatigue life. Thus, an object of the invention is to provide an improved spring element of the stringer type for use in the manufacture of vehicle seats.

Another object is to provide an improved seat frame and stringer spring element combination in which the supporting characteristics of the spring element are controlled upon flexure by a timed supporting relation or sequence of flexure taking place between the spring element and the seat frame.

A further object of the invention is to provide an improved stringer type spring element which is formed from wire stock of round cross-section in areas of torsional stresses and of flattened cross-section in one or more areas of plain flexure or shear.

A still further object is to provide an improved stringer type spring element having one or both end portions in the form of "jack spring" portions formed from wire of round cross-section and a relatively straight wire intermediate portion constituting a "linear spring" portion the cross-section of which throughout at least a portion of its length is flattened to improve the fatigue life under flexure or shear.

These and other objects and advantages of the invention will more fully appear from the following description and claims.

Figure 2:
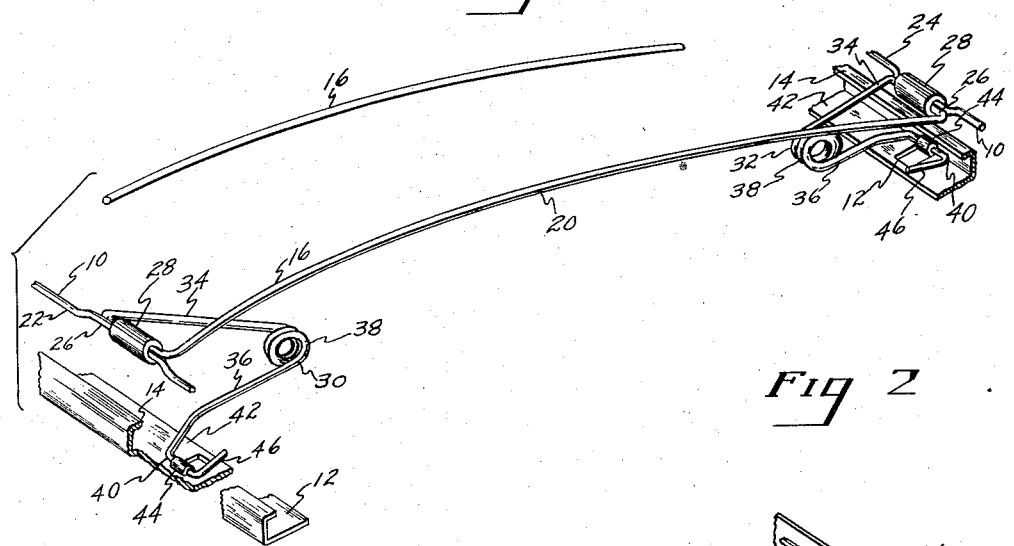
Figure 3:
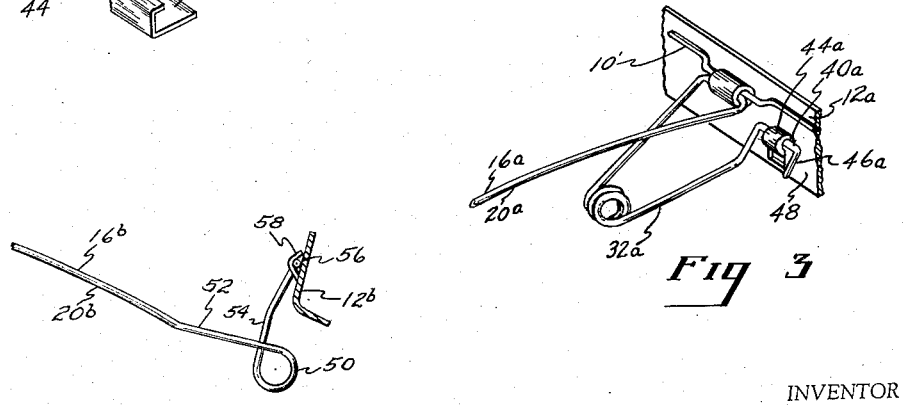
Figure 4:
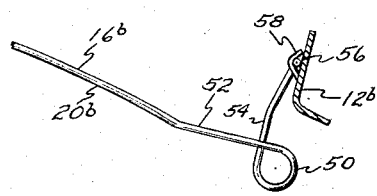

In the drawings,

Fig. 1 is a simplified vertical sectional view taken through a vehicle seat construction showing one form of our improved stringer spring installed therein, Fig. 2 is a fragmentary perspective view of Fig. 1, Fig. 3 is a view similar to Fig. 2 of one end of the spring element of modified form and shown adapted to a different frame construction, Fig. 4 is a fragmentary side elevational view of a modified form of spring element shown suspended from the seat frame, Fig. 5 is a side elevational view of a seat frame showing a further modified form of spring element adapted thereto.

Fig. 6 is a view similar to Fig. 5 showing a slightly different form of coil spring structure, Fig. 7 is a fragmentary elevational view of a modified form of coil spring structure, Fig. 8 is a view similar to Fig. 5 of a further form of the invention of a spring element having wire of a different cross-section, Fig. 9 is a cross-sectional view taken on line IX—IX of Fig. 8, Fig. 10 is a cross-sectional view taken on line X—X of Fig. 8, Fig. 11 is a sectional view taken at the floor tunnel showing a resilient pad associated with modified "linear spring" portions, Fig. 12 is a view taken through the pad on section XII—XII of Fig. 11, and Fig. 13 is a view similar to Fig. 12 of a modified form of pad.

Referring to the form of the invention shown in Figs. 1 and 2, a seat construction for automobiles is sufficiently illustrated to enable those skilled in the art to appreciate the principles of the present invention and their application to the various types of spring seat cushions and spring seat backs now in use in passenger automobiles, trucks, busses, and similar automotive vehicles. As shown, the spring seat comprises upper and lower border frames 10 and 12 which frames in actual practice may be fabricated from a plurality of elements. In practice, the upper frame 10 will usually be of a generally rectangular form and will be fabricated from flat resilient wire while the lower frame 12 will usually be of sheet metal rolled into a generally L-shaped form with the edges 14 of the vertical leg inwardly turned to increase the rigidity of the frame 12. It is, of course, understood that the frame 12 will be welded or otherwise associated with the main sub-frame of the seat especially in the case of an adjustable seat, such sub-frames usually being in the form of tubular members as hereinafter shown in some of the illustrated modifications of the present invention.

The frame 10 is held in spaced resilient supporting relation to the frame 12 by a plurality of parallel arranged stringer springs 16 which constitute the main resilient supporting element for the load to be carried upon the upper upholstered surface 18 of the seat. Springs 16 each comprise a "linear spring" portion 20 preferably formed from a relatively straight portion of spring wire extending between the front and back portions 22 and 24, respectively, of the upper frame 10 with integral angular portions 26 being provided for attaching the portion 20 to the frame 10 by clips 28 in a well known manner. Integral with the angular portions 26 are "jack spring" portions 30 and 32 each having leg portions 34 and 36 converging into a close wound helical spring coil 38, the leg portions 34 each being an integral extension of the angular portions 26 and the leg portions 36 each being an integral extension of the angular fulcrum portions 40 of which each are resting upon the upper surface 42 of the frame 12 and are confined in position for rocking action on the surface 42 by clip portions 44 lanced from the frame 12 and curled around the portions 40 with a free fit. The portions 40, at one or both ends of the spring 16, may have angular helper extensions 46 which, with the springs 16 under less than the maximum anticipated deflection in use, will be angularly disposed to the surface 42 as shown in the drawings. Under predetermined loading of the spring 16 and their associated jack spring portions 30 and 32, the "helper" extensions 46 will be rocked into abutment engagement with the surface 42 to place torsional stresses upon the portion 40 and, thus, augment the resilient supporting characteristics of the "linear spring" portion 20 and the jack spring portions 30 and 32 in timed or sequence relation and making it possible to employ a minimum amount of wire in the spring elements 16 as compared with similar shape and employing zig zag type of spring elements.

In Fig. 3 a slightly modified arrangement is shown for suspending the inner end of the spring 16a from a surface 48 of the lower frame 12a. In this construction, the jack spring portion 32a has the fulcrum portion 40a so located as to be suspended from the clip portion 44a with the "helper" portion 46a extending downwardly and angularly outwardly from the surface 48 with which it abuts under predetermined deflection of the spring 16a all in the same manner as described with reference to Fig. 2.

Fig. 4 shows a further modification of the rear end of the spring element 16 of Fig. 1 wherein the spring element is suspended from the rear frame portion as shown in Fig. 3. In Fig. 4, the spring element 16b does not attach to the frame 12b through a "jack spring" portion as shown in Figs. 2 and 3. Along the rear of the seat the upper border structure corresponding to the upper frame 10 has been replaced functionally by the frame 12b and the "linear spring" portion 20b merges into a spring coil portion 50 having leg portions 52 and 54, the portion 54 extending upwardly and having a right angle fulcrum portion 56 and suspended from eye 58 integrally formed from the frame portion 12b. When the seat is trimmed, it will be understood that the trim contour will be located at approximately the location of the hinge point of the portion 56 within the eye 58.

In Fig. 5 the principles of the present invention are shown adapted to a front seat of a passenger automobile and so designed as to enable the manufacture of an automobile having the maximum amount of head room with the lowest possible profile. The main adjustable seat frame 60 carries front and rear transverse frame members 62 and 64. Spring elements 16c have "linear spring" portions 20c which are attached at the front end of the frame 62 through integral "jack spring" portions 66 and at the rear end to the frame 64 through the close wound helical spring coil 68 having leg portions 70 and 72, leg portion 72 being angularly formed at 74 to suspend the rear end of the spring element 16c from the clip 76. The "jack spring" portion 66 is shown with a "helper" portion 46c as also may be provided the portion 74, if the desired characteristics of the element 16c so requires.

Figure 6 shows a slightly different form of the invention adapted to the seat frame of Fig. 5 and also illustrates the manner in which the crown of the "linear spring" portion 20 of Fig. 1 may be obtained. As shown, the spring element 16d has a "jack spring" portion 76 and an extension close wound helical coil spring 78 integrally associated at opposite ends of the "linear spring"

portion 20d. The angular relation of the leg portion 80 to the spring 78 to the portion 20d may be varied to suit the desired conditions of support. The angular end 82 of the portion 80 is suspended in the clip 76. To provide the "linear spring" portion 20d with a crown, should one be desired, as indicated between the full and dotted lines, the angle A is increased or decreased on forming and prior to tempering whereby the desired crown thereafter results when the spring element 16d is sprung into position between the frames 62 and 64.

Fig. 7 shows another form of the spring 68 of Fig. 5 in which the coils of the spring 68 are reversely wound from that shown in Fig. 5. In practice, the springs 68 and 68a will usually have two or three turns.

Into the spring element 16e of Fig. 8, there has been combined several of the features of the present invention which all go to making it possible to economically and practically manufacture a seat for vehicles which is particularly well adapted to the present trend toward vehicles of low profile. Using a minimum of spring elements 16d and less spring wire than has heretofore been considered possible from the point of view of satisfactory riding characteristics, we have been able to meet the requirements of the automobile manufacturer. The straight wire portion defining the "linear spring" portion 20d is shown of flattened form between the points a and b in order to provide longer life by giving protection against fatigue, as more clearly appears from the section of Fig. 10 taken on line X—X of Fig. 8. It is between the points a and b that the maximum plane flexure or shear takes place upon the spring element 16d. In the areas of torsional stresses, the wire is preferably round as shown in Fig. 9 taken on line IX—IX of Fig. 8. "Helper" portions 46f are shown at opposite ends of the element 16f for engagement with the adjacent surfaces of the frames 62 and 64 upon predetermined deflection of the "jack spring" portion 84 and the coil spring 86.

It will be understood that upon extreme deflection of the stringer springs 16 that after the "helper" 46 has engaged the surface 42 that continual deflection will bring the leg 36 into engagement with the surface 42. This sequence of contact with the frame 12 permits the load supporting character of the spring 16 to adjust itself to the riding condition. Further by increasing or decreasing the length of the fulcrum portion 40 the load supporting characteristics of the spring 16 may be conveniently altered. For example, by increasing the length of the portion 40, the action of the spring 16 is "softened" with the "helper" 46 engaged with the surface 42 and the portion 40 under torsional load. In practice the length of the portion 40 will be in the order of 1⅝" to 1¾". It is also found advisable to use a ⅜" to ½" radius between the portion 40 and the "helper" 46 and leg 36 to provide adequate fatigue life under prolonged deflection of the spring 16 under loads deflecting the "helper" 46 into engagement with the surface 42.

Present trends in design of passenger automobiles have resulted in pronounced tunnels above the drive shafts and defined in the floor beneath the spring seat construction. Then directly above the tunnel the seat must be thinner, or have less deflection, or both, in order to avoid striking bottom under conditions of maximum deflection. To meet this situation it has been proposed to supply the resilient support over the tunnel by the insertion of a resilient pad of suitable molded material such as sponge rubber, polyurethane foam, or the like. This pad may be confined to the area directly over the tunnel or it may be extended across the full width of the seat.

As shown in Figs. 11 to 13, the present invention lends itself readily to the convenient and practical support and retention of the molded resilient pad 88 over the area of the tunnel 90. In this particular part of the seat structure, depending upon the width of the pad 88, several of the springs 16 may be molded into position within the pad 88 prior to being assembled in the frame 12. To clear the tunnel 90, some modification of the spring 16 is required as shown. This arrangement will firmly and permanently support the pad 88 in position and also insulate the "linear spring" portion 20 from the tunnel 90 upon extreme deflection.

In lieu of molding the spring 16 within the pad 90, Fig. 13 shows an arrangement whereby the pad 90' is molded with slots 92 to receive the "linear spring" portion 20. This permits installing the pad 90' in position after the springs 16 in the area of the tunnel 88 have been assembled in the frame 12.

Having thus described our invention what we claim as new and desire to protect by Letters Patent is:

1. A stringer type spring wire element for vehicle seats and the like comprising a linear spring portion in the form of a relatively straight wire portion, a jack spring portion integral with said linear spring portion and disposed at one end thereof in off-set relation thereto, the wire of said jack spring portion being of circular cross section and at least a part of said straight wire portion being of flattened cross section.

2. A stringer type spring wire element for vehicle seats and the like comprising a linear spring portion in the form of a relatively straight wire portion, a jack spring portion integral with said linear spring portion and disposed at one end thereof in off-set relation thereto, said jack spring having an angularly disposed fulcrum portion for the support of said jack spring portion upon a frame surface and a helper spring portion integral with said fulcrum portion and angularly disposed thereto for engagement with the frame surface to torsionally load said fulcrum portion upon deflection of said jack spring portion.

3. A stringer type spring wire element as defined in claim 2, said jack spring having a leg portion angularly merging with said fulcrum portion and being less acutely disposed to the supporting frame surface than said helper spring portion whereby said leg portion has engagement with the frame surface following engagement of the helper spring portion upon deflection of said jack spring.

4. A pair of stringer type spring wire elements for vehicle seats and the like disposed in spaced relation and each comprising a linear spring portion defined by relatively straight lengths of wire and a jack spring portion integral with said linear spring portion and disposed at one end thereof in offset relation thereto and a resilient pad supported on and positioned by said elements.

5. In a vehicle seat, in combination with a supporting frame, a plurality of stringer spring wire elements supported in said frame, said elements each having a linear spring portion in the form of relatively straight wire, a jack spring portion integral with said linear spring portion and disposed in one end thereof at off-set relation thereto the integral connection between said jack and linear spring portions being in the form of a transverse torsion frame attachment portion.

6. In a vehicle seat, in combination with a frame, a plurality of stringer spring wire elements supported in said frame, each of said elements having a linear spring portion in the form of a relatively straight wire portion, jack spring portions at opposite ends of said linear spring portion and integral therewith and disposed in off-set relation thereto the integral connection between said jack and linear spring portions being in the form of a transverse torsion frame attachment portion.

7. In a vehicle seat as set forth in claim 5 wherein said jack spring has an angular fulcrum portion for the support of said jack spring portion upon said frame, and a helper spring portion integral with said fulcrum portion and angularly disposed thereto for engagement with said frame to torsionally load said fulcrum portion upon deflection of said jack spring portion.

8. In a vehicle seat as set forth in claim 7, said jack spring portion having a leg portion angularly merging with said fulcrum portion and being less acutely disposed to said frame than said helper spring portion whereby said leg portion has engagement with said frame following engagement of the helper spring portion therewith upon deflection of said jack spring portion.

9. In a vehicle seat in combination with a frame, stringer type spring wire elements transversely disposed in said frame, said elements having a central linear spring portion, means for supporting said linear spring portion in spaced relation to said frame, and a resilient pad supported upon said linear spring portions and located and retained in position relative to said frame by said linear spring portions.

10. In a vehicle seat as set forth in claim 9 wherein said resilient pad is molded upon said linear spring portions.

11. In a vehicle seat as set forth in claim 9, said resilient pad having transversely disposed slots opening through one side of said pad to receive said linear spring portions for the support and positioning of said pad thereon.

References Cited in the file of this patent
UNITED STATES PATENTS

| | | |
|---|---|---|
| 2,022,892 | Marshall | Dec. 3, 1935 |
| 2,250,486 | Kronheim | July 29, 1941 |